United States Patent
Hsieh et al.

(10) Patent No.: US 8,270,067 B1
(45) Date of Patent: Sep. 18, 2012

(54) SAGNAC DELAY-LINE INTERFEROMETER FOR DPSK DEMODULATION

(75) Inventors: Yung-Chieh Hsieh, San Jose, CA (US); Chiayu Ai, Newark, CA (US)

(73) Assignee: Optoplex Corporation, Fremont, CA (US)

( * ) Notice: Subject to any disclaimer, the term of this patent is extended or adjusted under 35 U.S.C. 154(b) by 0 days.

(21) Appl. No.: 13/079,131

(22) Filed: Apr. 4, 2011

Related U.S. Application Data

(63) Continuation-in-part of application No. 12/509,474, filed on Jul. 26, 2009, now abandoned.

(60) Provisional application No. 61/084,229, filed on Jul. 28, 2008.

(51) Int. Cl.
*G02F 2/00* (2006.01)
*G02B 1/10* (2006.01)

(52) U.S. Cl. ........ 359/325; 359/583; 359/584; 398/201; 356/477

(58) Field of Classification Search .......... 359/325, 359/577, 583, 584, 589, 629, 634; 356/450, 356/477; 398/183, 188, 201, 202, 208, 212
See application file for complete search history.

(56) References Cited

U.S. PATENT DOCUMENTS

| | | | | |
|---|---|---|---|---|
| 3,517,982 | A * | 6/1970 | Fonda-Bonardi | 359/279 |
| 4,335,939 | A * | 6/1982 | Stovell et al. | 359/247 |
| 4,773,732 | A * | 9/1988 | Schafer | 359/578 |
| 6,360,037 | B1 * | 3/2002 | Riza | 385/22 |
| 6,909,549 | B1 * | 6/2005 | Hsieh et al. | 359/578 |
| 7,526,210 | B2 * | 4/2009 | Liu | 398/188 |
| 7,668,466 | B2 * | 2/2010 | Tian et al. | 398/202 |
| 7,847,952 | B2 * | 12/2010 | Suzuki et al. | 356/491 |
| 7,848,662 | B2 * | 12/2010 | Suzuki et al. | 398/208 |

* cited by examiner

*Primary Examiner* — Daniel Petkovsek
(74) *Attorney, Agent, or Firm* — Antonio R. Durando

(57) ABSTRACT

A DPSK demodulator is implemented in Sagnac interferometer configuration with a delay line element introduced in one or both of the optical paths of the transmitted and reflected beams. Because the two reflected and transmitted beams travel on the same optical path (though in opposite directions), the Sagnac interferometer provides all the advantages of a common-path interferometer, is thermally and mechanically stable, and the phase requirements are greatly reduced. In its simplest form, the Sagnac DPSK demodulator. In the preferred embodiment, the beam-splitting surface and one of the mirrors are combined into a rhomb beam-splitter structure and the other two mirrors into a right-angle prism. In a DQPSK embodiment, the input beam is split by an upfront beam splitter into two parallel beams that are then directed toward the rhomb-beam-splitter/right-angle-prism combination of the invention.

20 Claims, 4 Drawing Sheets

SAGNAC DELAY-LINE INTERFEROMETER FOR DPSK DEMODULATION

RELATED APPLICATIONS

This application is a Continuation-In-Part Application of Ser. No. 12/509,474, filed Jul. 26, 2009, which is based on and claims the priority of U.S. Provisional Application Ser. No. 61/084,229, filed Jul. 28, 2008.

BACKGROUND OF THE INVENTION

1. Field of the Invention

This invention relates to differential phase-shift keying (DPSK) in telecommunication. More specifically, it relates to methods in DPSK for converting a phase-keyed signal to an intensity-keyed signal.

2. Description of the Prior Art

Phase-shift keying (PSK) is a digital modulation scheme that conveys data by changing, or modulating, the phase of a reference signal (the carrier wave). Any digital modulation scheme uses a finite number of distinct signals to represent digital data. In the case of PSK, a finite number of phases is used. Each of these phases is assigned a unique pattern of binary bits. Usually, each phase encodes an equal number of bits. Each pattern of bits forms the symbol that is represented by the particular phase. The demodulator, which is designed specifically for the symbol-set used by the modulator, determines the phase of the received signal and maps it back to the symbol it represents, thus recovering the original data. This requires the receiver to be able to compare the phase of the received signal to a reference signal (such a system is termed coherent).

Alternatively, instead of using bit patterns to set the phase of the wave, the patterns are used to set changes in the phase of the signal. The demodulator then determines the changes in the phase of the received signal rather than the phase itself. Since this scheme depends on the difference between successive phases, it is termed differential phase-shift keying (DPSK). DPSK can be significantly simpler to implement than ordinary PSK because there is no need for the demodulator to have a copy of the reference signal to determine the exact phase of the received signal (i.e., it is a non-coherent scheme).

In telecommunication technology, differential phase-shift keying utilizes a decoding method in order to convert the phase-keyed signal to an intensity-keyed signal at the receiving end. The decoding method can be achieved by comparing the phase of two sequential bits. In principle, it splits the input signal beam into two channels with a small delay before recombining them. After the recombination, the beams from the two channels interfere constructively and destructively. The interference intensity is measured and becomes the intensity-keyed signal. To achieve this, one channel has an optical path longer than the other by a distance equivalent to the photon flight time of one bit. For instance, in a 40 Gbit-per-second system, one bit is equal to 25 ps and light travels 7.5 mm in that period. Thus, in this example, the optical path difference (OPD) between the two channels would be set at 7.5 mm.

The Mach-Zehnder type interferometer with a desired OPD between the two channels has been used for decoding purposes. Because of the properties of optical interference, a change in OPD can greatly affect interference intensity. Moreover, the optical path in each arm is much longer than its difference. Therefore, a sophisticated temperature control is required to maintain the optical path in each arm in order to assure that the change in the OPD is much less than a small fraction of one wavelength, e.g., about 10 nm. This is difficult and expensive to achieve, especially for an interferometer with a long optical path.

Copending U.S. application Ser. No. 11/360,959 and Ser. No. 11/485,653 describe various embodiments of novel Michelson-type interferometers used as DPSK demodulators to determine the changes in the phase of a received signal. In the demodulator, the input beam is split into two portions at the beam splitter. The two beams travel a different path and are returned by their corresponding reflector. Because the optical path lengths (OPLs) are different, the two returned beams have a time delay with respect to each other. The OPD of the system, the difference between the two OPLs, is designed to assure that the delay is approximately equal to the time delay of any two successive bits and is equal to the time interval multiplied by the speed of light.

These demodulators based on Michelson-type interferometers provided a significant improvement over the prior art; however, they still require a substantially perfect balance between the two arms of the interferometer in terms path length, polarization phase shift, and thermal compensation. Copending U.S. application Ser. No. 12/505,483 describes a Michelson configuration with a pseudo common-path delay-line design that materially simplifies the process of achieving and maintaining the required optical path difference in the two arms of the interferometer. This invention describes a true common-path demodulator based on a Sagnac interferometer configuration.

SUMMARY OF THE INVENTION

This invention is based on the idea of implementing a DPSK demodulator using the Sagnac interferometer configuration with a delay line element introduced in one or both of the optical paths of the transmitted and reflected beams. In the Sagnac interferometer, the input beam is split into two beams traveling in opposite directions clockwise and counterclockwise. The two beams are recombined at the beam splitter and interfere to produce two output beams that are 180 degrees out of phase with each other. Because the two beams travel on the same optical path (though in opposite directions), the Sagnac interferometer has all the advantages of a common-path interferometer; that is, both beams experience the same wavefront distortion, phase change on reflection, phase change on transmission, attenuation, etc. Therefore, the interferometer is thermally and mechanically stable and the phase requirements for the various optical elements of the interferometer are greatly reduced.

The Sagnac interferometer consists of a beam splitter combined with several mirrors to provide a closed-loop optical path that is common to the beams transmitted and reflected by the beam splitter, typically in a square trajectory. Fiber optics may also be employed to guide the light. FIG. 1 illustrates a three-mirror embodiment 10 of a Sagnac interferometer comprising a beam-splitting surface 12 and three mirrors 14,16,18 arranged so as to define a common circular path for the transmitter and reflected beams T and R, respectively. One of the output beams (O1) is overlaid on the input beam I. Using a circulator 20, the two outputs O1 and O2 may be separated, as shown. However, simply by offsetting the placement of one of the mirrors, as illustrated in FIG. 2 with mirror 14, the paths of the transmitted and reflected beams may be shifted slightly to cause them to recombine at a location on the beam-splitting surface 12 other than at the point of incidence of the input beam I. As a result, the two output beams can be accessed without the use of a circulator while still enjoying the advantage of a common-path interferometer. In its simplest form, the Sagnac DPSK demodulator of the invention includes a delay element in the optical path of either or both the transmitted beam and the reflected beam.

In the preferred embodiment of the invention, the beam-splitting surface and one of the mirrors are combined into a rhomb beam-splitter structure and the other two mirrors into a right-angle prism. The delay-line interferometer is then rendered athermal by selecting materials with the proper optical and thermal properties. In addition, the interferometer is preferably tuned by adding a phase tuner with a high optical thermal coefficient in each beam path.

In a differential quadrature phase-shift keying (DQPSK) embodiment of the invention, the input beam is split by an upfront beam splitter into two parallel beams that are then directed toward the rhomb-beam-splitter/right-angle-prism combination of the invention. Each beam is thus channeled into a separate DPSK demodulator that produces two outputs with phases 180 degrees apart. Because of the 90-degree phase separation introduced by delay element(s), each pair of outputs reflects the desired line delay and the phases of the four output beams produced by the device are 90 degrees apart, which provides an ideal setup for DQPSK demodulation.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

Figure 1:
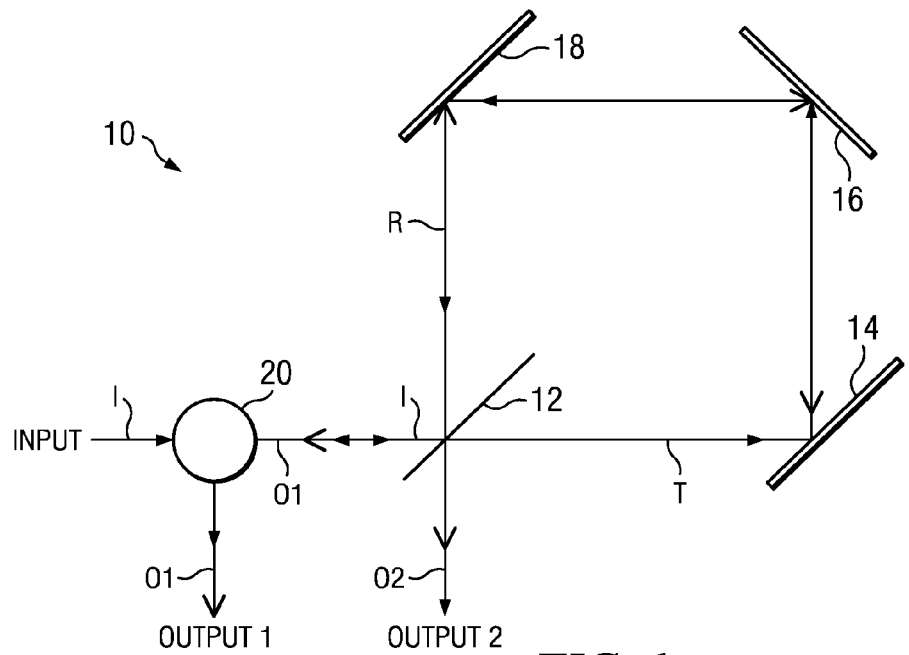
FIG. 1 illustrates schematically a conventional Sagnac interferometer.
Figure 2:
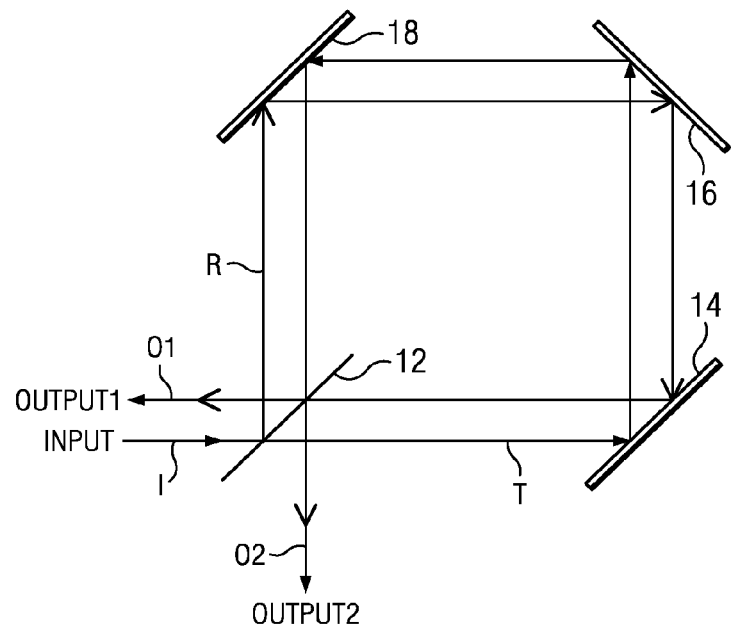
FIG. 2 illustrates the interferometer of FIG. 1 wherein the paths of the transmitted and reflected beams are slightly offset so as to cause them to recombine on the beam-splitting surface at a point separate from the point of incidence of the input beam.
Figure 3:
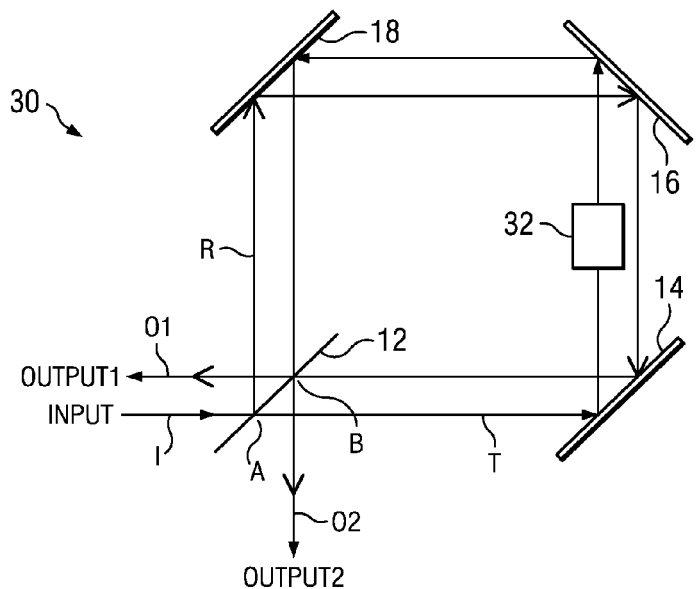
FIG. 3 illustrates schematically the configuration of a delay-line Sagnac interferometer according to the invention.

Referring to the figures, wherein like reference numerals and symbols are used throughout to refer to the same components, FIG. 3 illustrates schematically a common-path delay-line interferometric (DLI) demodulator 30 in Sagnac configuration according to the invention. The device includes the same optical elements of the interferometer of FIG. 2, wherein the first mirror 14 is shifted closer to the beam-splitting surface 12, in relation to the configuration of FIG. 1, in order to cause the transmitted beam T and the reflected beam R to impinge on the beam-splitting surface and interfere at a point B different from the point A where the incoming beam I impinges on the same surface. As mentioned, due to the extreme proximity of the transmitted and reflected beam paths, the two beams still travel essentially along a common path (though in opposite directions). However, the separation of the two beam paths allows access to each beam individually, thereby giving the opportunity to change the optical path length of one beam with respect to the other. When an optical delay element 32 is inserted in the path of the transmitted beam T, for example, a delay interferometer is achieved. By judiciously selecting the material of the delay element (i.e., with the appropriate optical and thermal properties), an athermal DLI may be implemented.

For example, if the delay element 32 consists of an athermal optical parallel plate with thickness d, the delay is equal to $(n-1)d$, where n is the refractive index of the material. The same result can also be obtained by placing a delay element in each of the two paths (i.e., of the T and R beams). For instance, for two thermally matching parallel plates, each placed in one of the two beam paths, the net delay is equal to $(n-1)d-(m-1)s$, where n and m are the refractive indices of the two plate materials, and d and s are the thicknesses of the plates. The values of d and s are selected according to their optical thermal coefficients (g and h, respectively). As one skilled in the art would readily recognize, if $(d)(g)=(s)(h)$, the device is athermal. Therefore, by choosing two materials with the right combinations of thickness (d and s) and optical thermal coefficients (g and h), the delay-line interferometer can have the required time delay and also be athermal.

Figure 4:
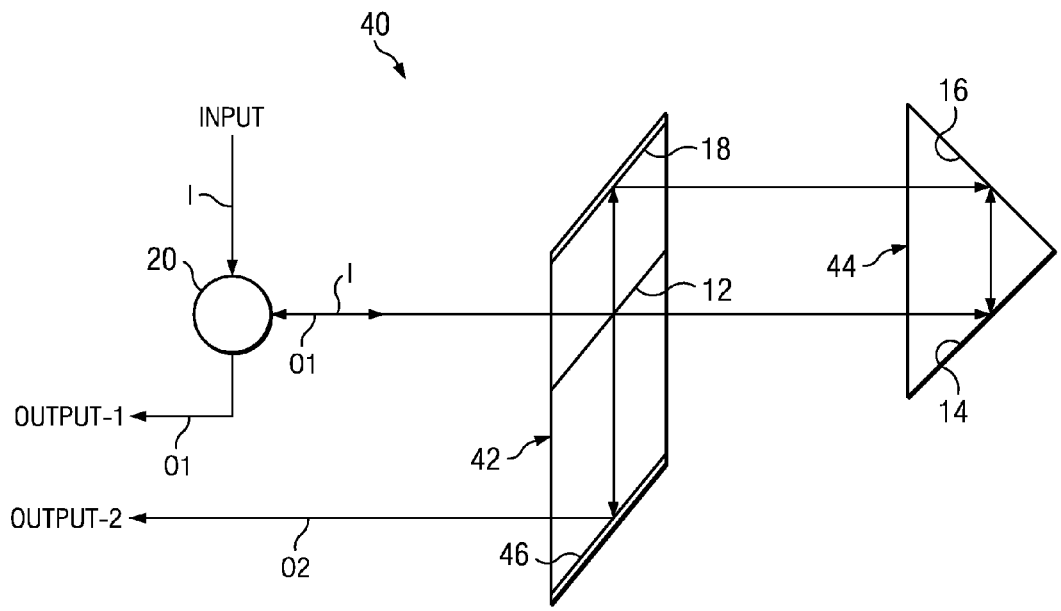
FIG. 4 illustrates a configuration of Sagnac interferometer using a rhomb beam-splitter structure and a right-angle prism.

In practice, as illustrated in the Sagnac DLI 40 of FIG. 4, the beam-splitting surface 12 and the mirror 18 in the reflection path of FIG. 3 can be combined into a rhomb beam splitter 42, and the mirrors 14 and 16 may be similarly incorporated into a single component, a right-angle prism 44. It is apparent that the configuration of FIG. 4 is functionally identical to the common-path interferometer of FIG. 1 wherein the rhomb structure 14 incorporates the beam-slitting surface 12 and the parallel mirror 18, while the right-angle prism 44 incorporates the reflective surfaces of the two mirrors 14 and 16. (Note that any pair of mirrors at 90 degrees from one another would provide the same function of a 90-degree prism.) After circulating along their respective optical paths, the transmitted and reflected beams T,R are recombined at the beam-splitting surface 12, where they interfere constructively and destructively to produce separate outputs O1 and O2. It is understood that the bottom reflective surface 46 of the rhomb structure 42, from which the output O2 emanates, is irrelevant to the features of the invention and can be oriented in any direction (that is, it need not be parallel to anything). It is also understood that this configuration will function in equivalent manner so long as the mirror 18 in the rhomb beam splitter 42 is parallel to the beam-splitting surface 12, the entrance and exit surfaces of the rhomb structure are flat, and the right-angle prism 44 is positioned substantially perpendicular to the R,T beams exiting from the rhomb structure.

The three reflective surfaces 14,16,18 are shown in the drawings at 90-degree angles so that each pair would fold an incoming beam. However, it is understood that the only critical feature for implementing the invention is a combination of mirrors (two or more) that provides total circularity so that both the transmitted beam T and the reflected beam R propagating from the beam splitter return to the beam splitter after having traveled their respective optical paths (counterclockwise and clockwise, respectively, with reference to a viewer of the figures). The terms "circular" and its derivatives, as used herein in the context of the optical paths of the beams transmitted and reflected by the beam splitter, mean that the paths both emanate from and return to the beam splitter as a result of reflection from the same mirrors along their paths, clockwise for the reflected beam and counterclockwise for the transmitted beam (or vice versa, depending on the position of the beam splitter in relation to the incoming beam). As used in the art with respect to Sagnac interferometers, "common path" and "common optical path" mean that both the reflected and the transmitted beam from a beam splitter follow substantially the same optical path, though in opposite circular directions. The term "rhomb" is adopted herein for simplicity, because commonly so used in the art, but it is understood that the precise geometric definition of the beam-splitter structure 42 illustrated in the figures is not a rhomb but a parallelepiped (that is, a three-dimensional figure formed by six parallelograms, a parallelogram being a quadrilateral with two sets of parallel sides). Therefore, the invention is not to be limited to any particular form of beam-splitter structure even though the term rhomb has been used herein for convenience to describe generally some optical elements that are suitable for practicing the invention. In particular, any structure with a reflective surface parallel to a beam-splitting surface and with flat entrance and exit surfaces can be used.

Figure 5:
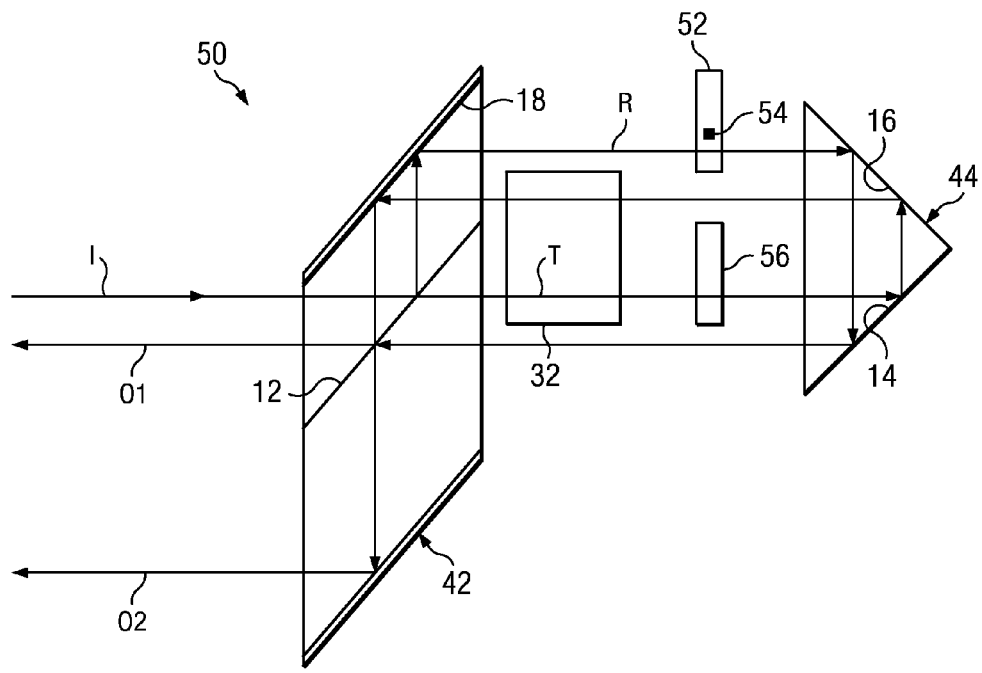
FIG. 5 is a delay-line Sagnac interferometer based on the configuration of FIG. 4 with various additional optical components for phase tuning and thermal compensation.

FIG. 5 illustrates a Sagnac DLI 50 according to the invention, wherein the prism 44 has been shifted slightly downward to separate the optical paths of the T and R beams and a delay element 32 has been introduced in the path of the transmitted beam T. A thermal phase tuner 52 with a micro-heater 54 is placed in the optical path of the reflection beam R to tune the phase of the DLI. As one skilled in the art will readily understand, the micro-heater 54 is incorporated into the tuner to vary its temperature as necessary to phase tune the DLI. A compensator 56, preferably a plate made of the same material as the phase tuner, is used to compensate for the thermal drift in the phase tuner introduced by the environment. The thickness of the compensator and the phase tuner can be determined in conventional manner. If the delay element 32 is made of an athermal material, the thickness of the compensator 56 should be the same as that of the phase tuner 52 to compensate for intrinsic thermal drift (i.e., the amount of delay drift due to the changes in ambient temperature). If the delay element is not athermal, then the thickness of the compensator 56 should be different from that of the phase tuner, and it should be selected as required to minimize such intrinsic thermal drift. As described above, the delay element can be either a single component or two with matching materials.

Figure 6:
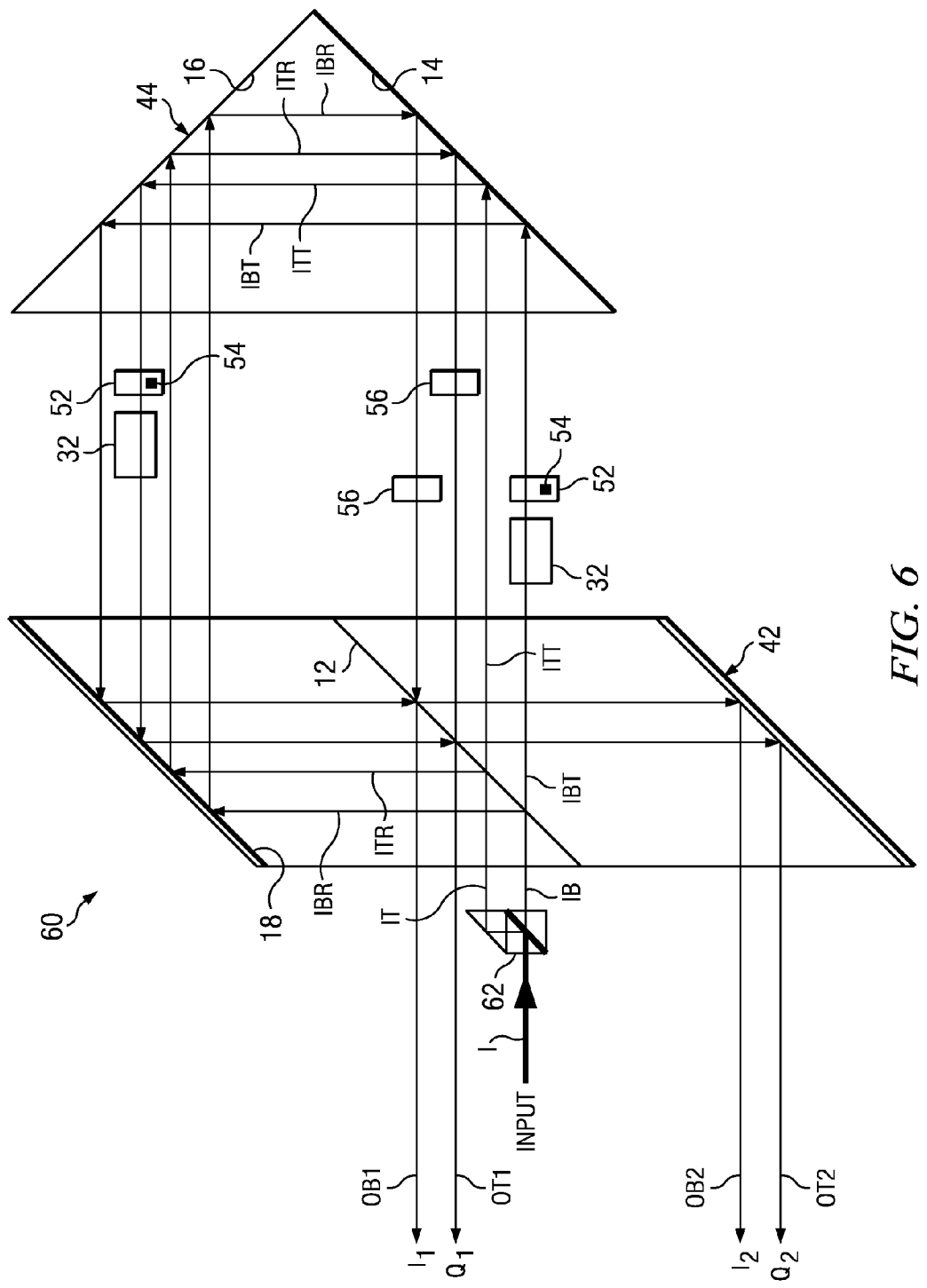
FIG. 6 illustrates in schematic elevational view a delay-line Sagnac interferometer for DQPSK demodulation.

It is understood that any one of the Sagnac DLI embodiments disclosed herein can be used to implement the function of a DPSK demodulator. FIG. 6 illustrates a DQPSK demodulator 60 realized using two DPSK demodulators according to the invention of FIG. 5. Such DQPSK demodulator is composed of a small upfront 50/50 beam-splitter cube 62 and a two integrated DPSK devices implemented with a single rhomb beam splitter 42 and a single right-angle prism 44. The input beam I is first split by the beam splitter 62 and the reflected beam is reflected again so that two equal beams (labeled IT and IB with reference to their respective top and bottom positions) are produced and proceed through the rhomb beam splitter 42 offset by a small displacement. Both beams (IT and IB) progress through the DQPSK demodulator 60 in separate respective circular optical paths, as described above. The four beams (ITR, IBR, ITT and IBT) that exit the rhomb beam splitter 42 are reflected and folded back by the right angle prism 44, and they are the reflected again by the top reflective surface 18 of the rhomb beam splitter. After circulating in opposite directions, the IBR and IBT beams are recombined and interfere upon returning to the beam-splitting surface 12, thereby producing outputs OB1 and OB2. Similarly, the ITR and ITT beams are recombined and interfere at the beam-splitting surface 12 to produce outputs OT1 and OT2. Note that the use of the right-angle reflector 44 eliminates the need for a circulator because no output beam is collinear with the input beam to the system (due to the reflector's slight shift that causes the beams to recombine at a different beam-splitter location—the offset between points A and B in FIG. 3). Delay elements 32, as well as thermal phase tuners 52 and compensators 56, are preferably added in each DPSK demodulator, as taught above.

In this design, the amount of path length delay and the phase tuning for the two DPSK circuits can be set independently. In DQPSK operation, the phase difference between the outputs produced by the top and bottom input beams IT and IB is nearly 90 degrees. Therefore, each pair of outputs reflects the desired line delay and the phases of the four output beams produced by the device are 90 degrees apart, which provides an ideal setup for DQPSK demodulation.

Thus, a simple device and mode of operation have been disclosed that provide significant advantages over prior-art demodulators. By creating a small offset in the paths of the transmitted and reflected beam of a Sagnac interferometer, a delay element can be introduced in either path, thereby providing a DLI suitable for signal DPSK demodulation. Due to the proximity of the clockwise and counterclockwise beam paths, this DLI Sagnac interferometer has also the advantage of a common-path interferometer. By selecting a material with the proper optical-thermal property, a thermally stable DLI can be achieved. By adding a phase tuner and a matching compensator, a tunable and thermally stable DLI is obtained. Finally, by combining two DPSKs sharing the same beam-splitter structure and folding prism, a compact DQPSK may be implemented.

Figure 7:
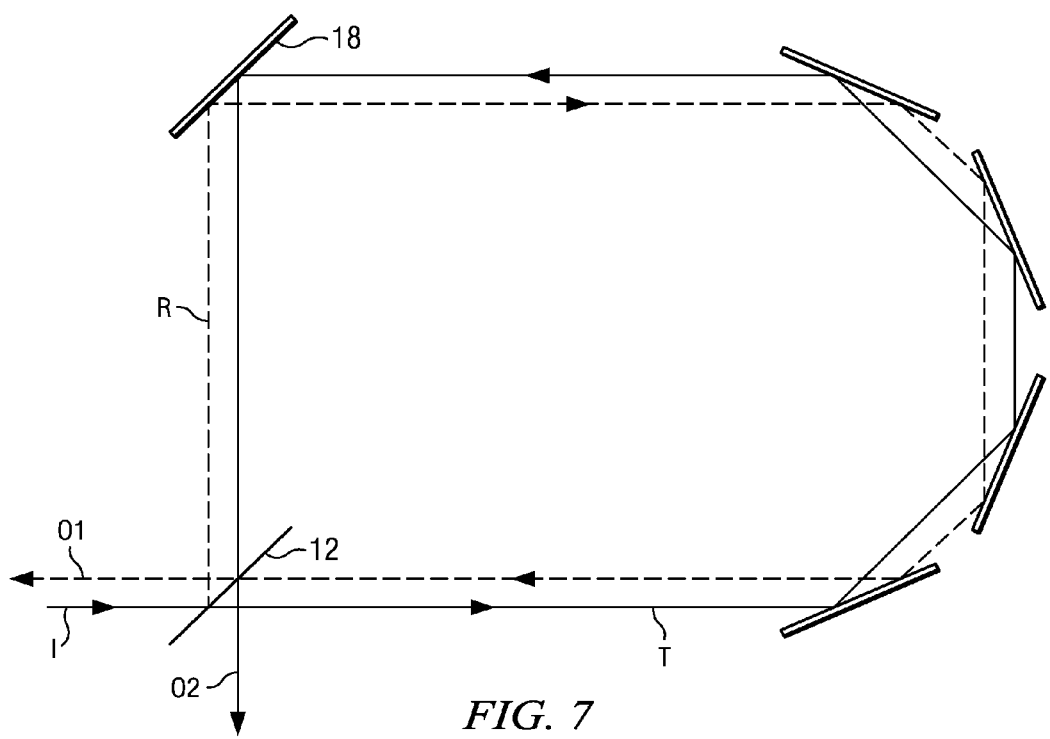
FIG. 7 illustrates in schematic view a delay-line Sagnac interferometer implemented with a beam splitter and five mirrors.

While the invention has been shown and described in what are believed to be the most practical and preferred embodiments, it is recognized that departures can be made therefrom within the scope of the invention. For example, the Sagnac interferometer configuration has been illustrated throughout as a beam splitter combined with three mirrors to form a circular optical path for both the reflected and the transmitted beam. However, it is understood that the same effect can be achieved with any odd number of mirrors, as illustrated schematically in FIG. 7 (with five mirrors). Therefore, the invention is not to be limited to the details disclosed herein, but is to be accorded the full scope of the claims so as to embrace any and all equivalent apparatus and methods.

We claim:

1. A delay-line interferometric demodulator comprising:
   a beam-splitter surface;
   at least two reflective surfaces positioned so as to reflect back circularly to the beam-splitter surface along a substantially common optical path a transmission beam and a reflection beam produced by an input beam incident on the beam-splitter surface, said transmission and reflection beams producing respective separate output beams 180 degrees out of phase after interference therebetween; and
   an optical delay element along an optical path of at least one of said transmission beam and reflection beam.

2. The demodulator of claim 1, further including a thermal phase tuner to tune a phase of the delay-line interferometric demodulator.

3. The demodulator of claim 2, further including a compensator to compensate for a thermal drift in the phase tuner.

4. The demodulator of claim 1, wherein said at least two reflective surfaces are three reflective surfaces, each positioned at a 45-degree angle with respect to said transmission and reflection beams as they propagate though their respective circular optical paths.

5. The demodulator of claim 4, wherein said beam-splitter surface and a parallel reflective surface are incorporated in an optical structure, and two reflective surfaces are incorporated in a right-angle prism.

6. The demodulator of claim 5, further including a thermal phase tuner to tune a phase of the delay-line interferometric demodulator.

7. The demodulator of claim 6, further including a compensator to compensate for a thermal drift in the phase tuner.

8. The demodulator of claim 5, further including an upfront beam splitter dividing said input beam into two parallel beams directed into the optical structure, thereby providing two delay-line interferometric demodulators.

9. The demodulator of claim 8, further including a thermal phase tuner to tune a phase in each of said delay-line interferometric demodulators.

10. The demodulator of claim 9, further including a compensator to compensate for a thermal drift in said thermal phase tuner in each of said delay-line interferometric demodulators.

11. A method for demodulating optical signals interferometrically, the method comprising the following steps:

splitting an input beam containing said optical signals into a reflection beam and a transmission beam with a beam-splitter surface;

reflecting said reflection beam and transmission beam with at least two reflective surfaces positioned so as to reflect back circularly said transmission beam and reflection beam to the beam-splitter surface along a substantially common optical path, said transmission and reflection beams producing respective separate output beams 180 degrees out of phase after interference therebetween; and delaying at least one of said transmission beam and reflection beam along said substantially common optical path.

12. The method of claim 11, further including the step of phase tuning a phase of at least one of said transmission beam and reflection beam.

13. The method of claim 12, further including the step of compensating for a thermal drift in a phase tuner utilized for said phase tuning step.

14. The method of claim 11, wherein said at least two reflective surfaces are three reflective surfaces, each positioned at a 45-degree angle with respect to said transmission and reflection beams as they propagate though their respective circular optical paths.

15. The method of claim 14, wherein said beam-splitter surface and a parallel reflective surface are incorporated in an optical structure, and two reflective surfaces are incorporated in a right-angle prism.

16. The method of claim 15, further including the step of phase tuning a phase of at least one of said transmission beam and reflection beam.

17. The method of claim 16, further including the step of compensating for a thermal drift in a phase tuner utilized for said phase tuning step.

18. The method of claim 15, further including the step of dividing said input beam into two parallel beams directed into the optical structure, thereby providing two delay-line interferometric circuits.

19. The method of claim 18, further including the step of phase tuning a phase of at least one of said transmission beam and reflection beam.

20. The method of claim 19, further including the step of compensating for a thermal drift in a phase tuner utilized for said phase tuning step.

* * * * *